(12) United States Patent
Rahul et al.

(10) Patent No.: US 12,346,226 B2
(45) Date of Patent: Jul. 1, 2025

(54) SYSTEM AND METHOD FOR SEU DETECTION AND CORRECTION

(71) Applicants: XILINX, INC., San Jose, CA (US); Advanced Micro Devices, Inc., Santa Clara, CA (US)

(72) Inventors: Kumar Rahul, Hyderabad (IN); Santosh Yachareni, Hyderabad (IN); Pierre Maillard, Campbell, CA (US); Mrinmoy Goswami, Hyderabad (IN); Tabrez Alam, Hyderabad (IN); Gokul Puthenpurayil Ravindran, Hyderabad (IN); Md Hussain, Hyderabad (IN); Sanat Kumar Dubey, Hyderabad (IN); John J. Wuu, Fort Collins, CO (US)

(73) Assignees: XILINX, INC., San Jose, CA (US); Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/376,724

(22) Filed: Oct. 4, 2023

(65) Prior Publication Data

US 2025/0117298 A1   Apr. 10, 2025

(51) Int. Cl.
*G06F 11/16*   (2006.01)
*G06F 11/07*   (2006.01)

(52) U.S. Cl.
CPC ........ *G06F 11/167* (2013.01); *G06F 11/0772* (2013.01); *G06F 11/1608* (2013.01)

(58) Field of Classification Search
CPC . G06F 11/167; G06F 11/0772; G06F 11/1608
USPC ......................................................... 714/764
See application file for complete search history.

(56) References Cited

U.S. PATENT DOCUMENTS

| | | | |
|---|---|---|---|
| 6,453,431 B1* | 9/2002 | Bernstein | G11C 5/005 714/E11.018 |
| 6,650,661 B1* | 11/2003 | Buchanan | H03M 9/00 327/407 |
| 6,831,496 B2* | 12/2004 | Gardner | H03K 3/0375 327/202 |
| 7,415,645 B2* | 8/2008 | Drake | G06F 11/187 714/724 |
| 7,418,641 B2* | 8/2008 | Drake | G06F 11/267 714/E11.16 |
| 8,185,812 B2* | 5/2012 | Das | G06F 11/167 714/814 |
| 9,281,807 B1 | 3/2016 | Maillard et al. | |
| 11,652,481 B2 | 5/2023 | Maillard et al. | |
| 2007/0162798 A1* | 7/2007 | Das | G06F 11/0721 714/724 |
| 2007/0168786 A1* | 7/2007 | Drake | G06F 11/187 714/724 |

\* cited by examiner

*Primary Examiner* — James C Kerveros
(74) *Attorney, Agent, or Firm* — Patterson + Sheridan, LLP

(57) ABSTRACT

Embodiments herein describe a circuit for detecting a single event upset (SEU). The circuit includes a latch including an output node, a first parity node, and a second parity node and correction circuitry configured to correct a single event upset (SEU) at the output node using the first and second parity nodes.

20 Claims, 6 Drawing Sheets

|  D  | P0  | P1  |
|-----|-----|-----|
|  0  |  0  |  0  |
|  1  |  1  |  1  |

FIG. 5

|  D  | S0  | S1  |
|-----|-----|-----|
|  0  |  0  |  0  |
|  1  |  1  |  1  |

FIG. 6

SYSTEM AND METHOD FOR SEU DETECTION AND CORRECTION

TECHNICAL FIELD

Examples of the present disclosure generally relate to detecting and correcting single-event upsets (SEUs) by utilizing flip flop circuit configurations.

BACKGROUND

Circuit designs for integrated circuits (ICs) can be generated using a variety of techniques. In some examples, designers can write register-transfer level (RTL) code, write program-language code, create schematic representations, or a combination thereof to design a circuit for implementation in a target IC device. The target IC device can be a programmable IC, such as a field programmable gate array (FPGA), a mask-programmable IC, such as an application specific integrated circuit (ASIC), or the like. In the design flow, a designer creates a description of the circuit design, which is then processed through one or more steps that transform the description into a physical implementation of the circuit design for a target IC device.

A memory cell can exhibit an unintentional change in state when subjected to radiation, such as cosmic rays, bombardment by neutrons or alpha particles, or the like. For example, a stored logic high value can be inadvertently changed to a logic low value and vice versa. Such "single-event upsets" can alter the functionality of a circuit, which can cause the circuit to fail. The rate of failure of a circuit due to single-event upsets is referred to as the single-event failure rate or "SER."

SUMMARY

One embodiment described herein is a memory circuit including a latch having an output node, a first parity node, and a second parity node, and correction circuitry configured to correct a single event upset (SEU) at the output node using the first and second parity nodes.

One embodiment described herein is a method for detecting a single event upset (SEU) on an output node of a latch, where the latch includes a first parity node and a second parity node, and correcting, by correction circuitry, the output node of the latch using the first and second parity nodes.

One embodiment described herein is a memory circuit including a master latch to receive data input and a slave latch coupled to the master latch, the slave latch having an output node, a first parity node, and a second parity node, wherein the first and second parity nodes are used to detect and correct the SEU at the output node.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 illustrates a truth table for the parity bits, according to an example.

FIG. 6 illustrates a truth table for the syndromes, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
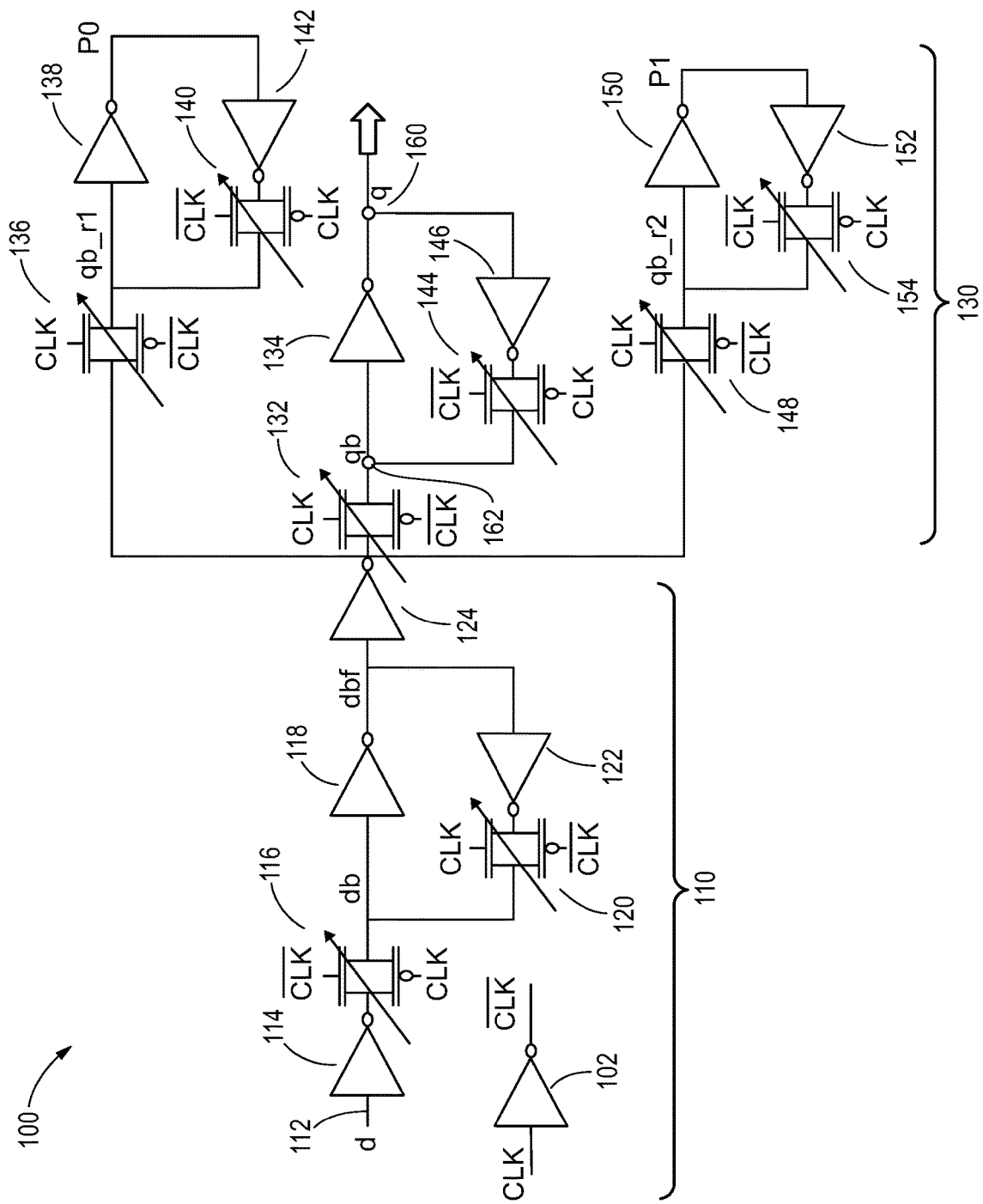
FIG. 1 illustrates a circuit with error correction capability, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe single-event upset (SEU) enhanced flip flops (FFs) with detection and correction capability. The SEU-enhanced FFs offer significant improvements over conventional SEU circuit configurations because the exemplary SEU-enhanced FFs provide for a low probability of experiencing a single event functional interrupt (SEFI) and system downtime, and provide for a low probability of experiencing data corruption. In other words, the exemplary SEU-enhanced FFs advantageously minimize or mitigate system downtime and considerably increase uptime.

SEUs in circuits encompass a range of phenomena associated with the interaction of energetic particles (e.g., ions, electrons, photons, a particles, X-rays, Y rays, etc.). In one example, charge generation events can include an ion strike. Charge generation in the active areas of transistors causes changes in internal voltages, which can lead to corruption of stored data. Data can be stored in, e.g., latches and flip flops, which are susceptible to radiation. Electrically, consequences of SEUs include at least temporary data loss in memories such as FFs and transistor latch up. In one embodiment, memory protection is achieved by using error detection and correction (ECC) techniques for single bit upsets. The exemplary circuit provides protection of logic storage elements (e.g., FFs) by detecting and correcting corrupted bits by employing two additional parity nodes.

However, all bits may not be of equal status in a device. There are different categories of bits, as some bits are more important than others. Bits can be generally categorized as non-essential bits, essential bits, and critical bits. When an ion strike occurs to a non-essential bit nothing happens and the operation continues uninterrupted. When an ion strike occurs to an essential bit, then some impact will be noticeable. An essential bit can be, e.g., a data pass related response. However, when an ion strike occurs to a critical bit, functionality of the device may be lost, thus resulting in potential downtime. In certain environments, such as, e.g., in a space datacenter application, although there is a certain radiation resiliency, heavy charged particles are still able to break the redundancy due to larger charge deposition or higher radiation levels.

In view thereof, the exemplary circuit provides a mechanism to detect when a memory element has been corrupted (e.g., by high radiation, ion strike, etc.), and further provide a manner of correcting the data. Instead of incorporating features to merely avoid the data from being corrupted, the exemplary circuit goes a step further by providing a feature to correct the data and generate an error flag. Therefore, it is acceptable if a critical node is corrupted (or flipped) due to broken redundancy from large charge depositions or high radiation because the exemplary circuit has the capability to correct the affected bit of the critical node.

In one instance, the exemplary circuit corrects the corrupted or flipped bit by including two additional parity nodes to restore the output nodes to their original states (nodes q and qb discussed in the figures below). Error correction can refer to adding extra bits to the actual message to create a unique signature so that when any of the bits get corrupted, a new signature is generated to indicate that an error has occurred. In the exemplary circuit, the two additional parity nodes have been advantageously added for such signature capability.

FIG. 1 illustrates an SEU-enhanced circuit 100.

An SEU is the change in a logical state (bit flip) in a writable, electronic memory cell (soft error) caused by a single event. The different types of collision can result in a variety of secondary products, which cause a current pulse at the output of the attacked transistors. This can lead to a change in the charge distribution and thus to a "switching" of a p-n junction.

An SEU in a flip-flop manifests as a single-bit error. The error will be overwritten when the flip-flop is clocked the next time. In many systems, a single-bit error does not have any consequences. However, for control applications in mission-critical or life-critical systems, single-bit errors should be mitigated, and the exemplary the SEU-enhanced circuit 100 can successfully achieve such purpose.

The SEU-enhanced circuit 100 includes a master latch 110 and a slave latch 130.

The master latch 110 includes a clock 102, and an inverter 114 configured to receive data 112 (d). The output of the inverter 114 is coupled to a transmission gate or pass gate 116, shown by way of example as a complementary metal oxide semiconductor (CMOS) pass gate having both a p-type MOS (PMOS) transistor and an n-type MOS (NMOS) transistor. It is understood than any other pass gate may be used, including a single transistor pass gate. The pass gate 116 is coupled to a first branch including an inverter 118 and a second branch including a pass gate 120 and an inverter 122. The two branches are coupled to an inverter 124. The inverter 124 is electrically connected to the slave latch 130.

The slave latch 130 includes a pass gate 132 coupled to additional inverters and pass gates at a node 162 (node qb). For example, the pass gate 132 is coupled to a first branch having an inverter 134 and coupled to a second branch having a pass gate 144 and an inverter 146. At the output end, the first and second branches are connected at a node 160 (node q). Node q is the output node being monitored for bit corruption.

The upper section of the slave latch 130 further includes a pass gate 136 connected to a first branch having an inverter 138 and a second branch having a pass gate 140 and an inverter 142. The output node of the upper branch is designated as P0. The P0 node is the first parity node.

The lower section of the slave latch 130 further includes a pass gate 148 connected to a first branch having an inverter 150 and a second branch having a pass gate 154 and an inverter 152. The output node of the lower branch is designated as P1. The P1 node is the second parity node.

The SEU-enhanced circuit 100 enables the error correction capability within the flip flop itself. The SEU-enhanced circuit 100 restores the original nodes, that is the node 160 (node q) and the node 162 (node qb). These original nodes have been replicated twice. As noted above, the nodes P0 and P1 are referred to as parity nodes. The two parity nodes have been added for signature capability.

If any of the three nodes get corrupted, that is, nodes q, P0, and P1, the SEU-enhanced circuit 100 knows which of the three nodes has been corrupted and provides the capability to correct the corrupted node q, which is the primary output of the FF, by restoring the corrupted output node q to its original state. Further, even if two of the three nodes have been corrupted, the SEU-enhanced circuit 100 knows that the bit has been corrupted or flipped, and generates a flag in response. In one embodiment, the addition of the two parity nodes enables the SEU-enhanced circuit 100 to be about 1000 times more resilient than conventional SEU FF configurations.

In operation, an SEU can change the state of a FF while holding data. In one example, the SEU is detected and the actual value is stored in a latch node. Two additional parity nodes (or parity bits) are used in the SEU-enhanced circuit 100 to detect and correct one bit of data. Single data is of 1 bit only. The valid data is either 0 or 1. Hence, in the instance case, two or more storage elements are advantageously employed to provide for further redundancy. In the SEU-enhanced circuit 100, there are three outputs (q, P0, P1). However, there is interest only when the SEU corrupts one output, that is, output node q since it is the primary output of the FF. Once the SEU is detected, an error flag is further generated indicating that the SEU has corrupted the output node q. Moreover, the SEU-enhanced circuit 100 corrects the output node q and maintains the flipped latch node due to the SEU.

In another example, the SEU can also change the state of one of the parity nodes. In such case, the SEU-enhanced circuit 100 detects the SEU but does not correct the output (since the output node q has not been corrupted). As noted above, the primary output of the FF, that is, node q, is corrected. Once the SEU is detected, however, an error flag is still generated indicating that the SEU has corrupted the parity node. The error flag generated in response to the detection of the corrupted parity node provides an opportunity to reset the device to fix the error in the parity bit, e.g., during down time or a slow time.

The SEU-enhanced circuit 100 can be used in both terrestrial environments and space environments. Regarding terrestrial environments, as background neutron radiation varies with latitude and longitude, upset rates are usually quoted for sea-level, New York City (NYC). In other words, NYC sea level is the base point and any location above that base point is considered a higher environment where there is a probability of larger charged particles striking internal electronic components of systems. The SEU-enhanced circuit 100 can be used in other mission critical or life critical applications, such as, but not limited to, avionics applications, military applications, and autonomous vehicle applications.

Figure 2:
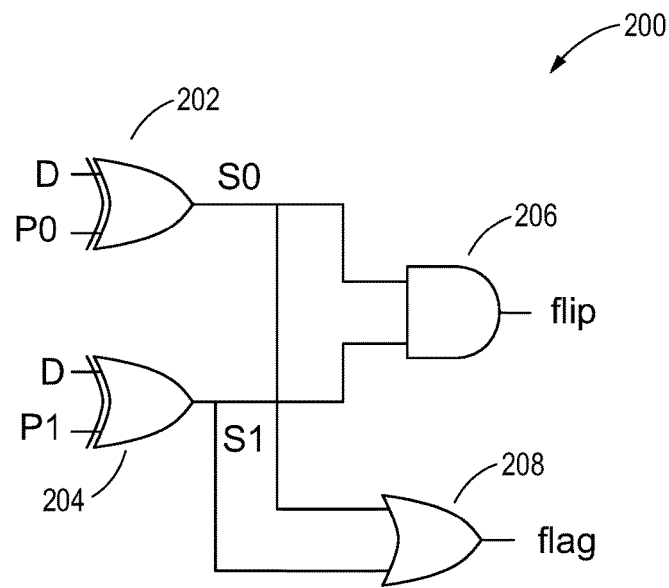
FIG. 2 is a flip and flag circuit, according to an example.

FIG. 2 is a flip and flag circuit, according to an example.

The flip and flag circuit 200 includes an exclusive OR (XOR) gate 202 and an XOR gate 204. The XOR gate 202 receives two inputs, that is, data (D) and the first parity bit (P0). Similarly, the XOR gate 204 receives two inputs, that is, data (D) and the second parity bit (P1). The outputs of the XOR gate 202 and the XOR gate 204 are fed into an AND gate 206 to indicate the flipping operation. The outputs of the XOR gate 202 and the XOR gate 204 are further fed into an OR gate 208 to indicate the flag operation. In other words, the output indicates whether a bit of any of the outputs D, P0, P1 has flipped, and if so, a flag is generated. The upper portion represents the logic for a flip and the lower portion represents the logic for a flag. The logic flip corresponds to the first syndrome (S0), whereas the logic flag corresponds to the second syndrome (S1). S0 means that D was flipped and should be corrected, S1 means that D was flagged. If the parity bits are flipped, S0 and S1 remain the same or intact, as discussed in FIGS. 7 and 8 below. The flip and flag circuit is part of the slave latch 130 of the SEU-enhanced circuit 100 (FIG. 1).

Figure 3:
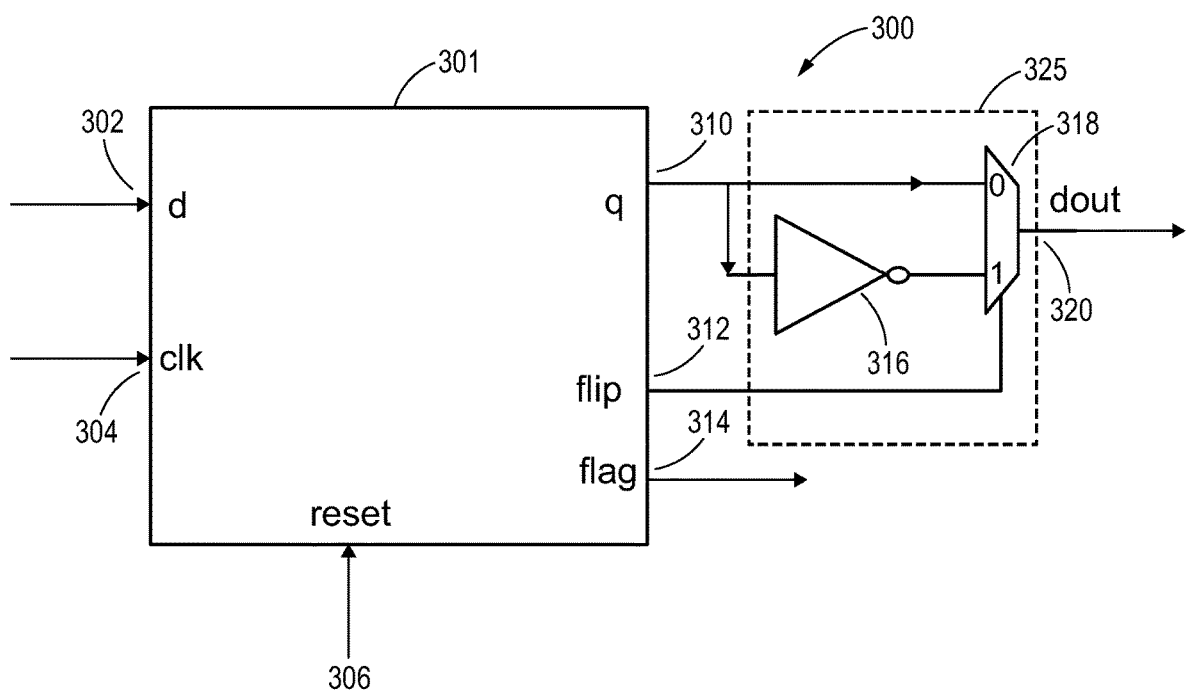
FIG. 3 illustrates the overall flip flop architecture, according to an example.

FIG. 3 illustrates the overall flip flop architecture, according to an example.

The flip flop architecture 300 includes a circuit portion 301 having two inputs, that is, Input 302 (d) and input 304 (clock), which are the same as described in FIG. 1. The input 306 is a "reset" used to get the flip flop back to its original state from the current state. The output of the flip flop architecture 300 includes output 310 (q) (as shown in FIG. 1), output 312 (flip) (as shown in FIG. 2), and output 314 (flag) (as shown in FIG. 2). That is, the circuit portion 301 includes the SEU-enhanced circuit 100 (FIG. 1) and the flip and flag circuit 200 (FIG. 2). In other words, both the circuits 100 and 200 are incorporated within the "box" representing the circuit portion 301.

The output 310 (q) is fed to an inverter 316, as well as to a flip element 318 to provide for output 320 (dout). The inverter 316 and the output 320 can be referred to as correction circuitry 325. The output 320 is configured to provide the correction to the corrupted node q. The correction circuitry 325 corrects the corrupted node q by employing the flip element 318 that flips the corrupted bit back to its original state.

Figure 4:
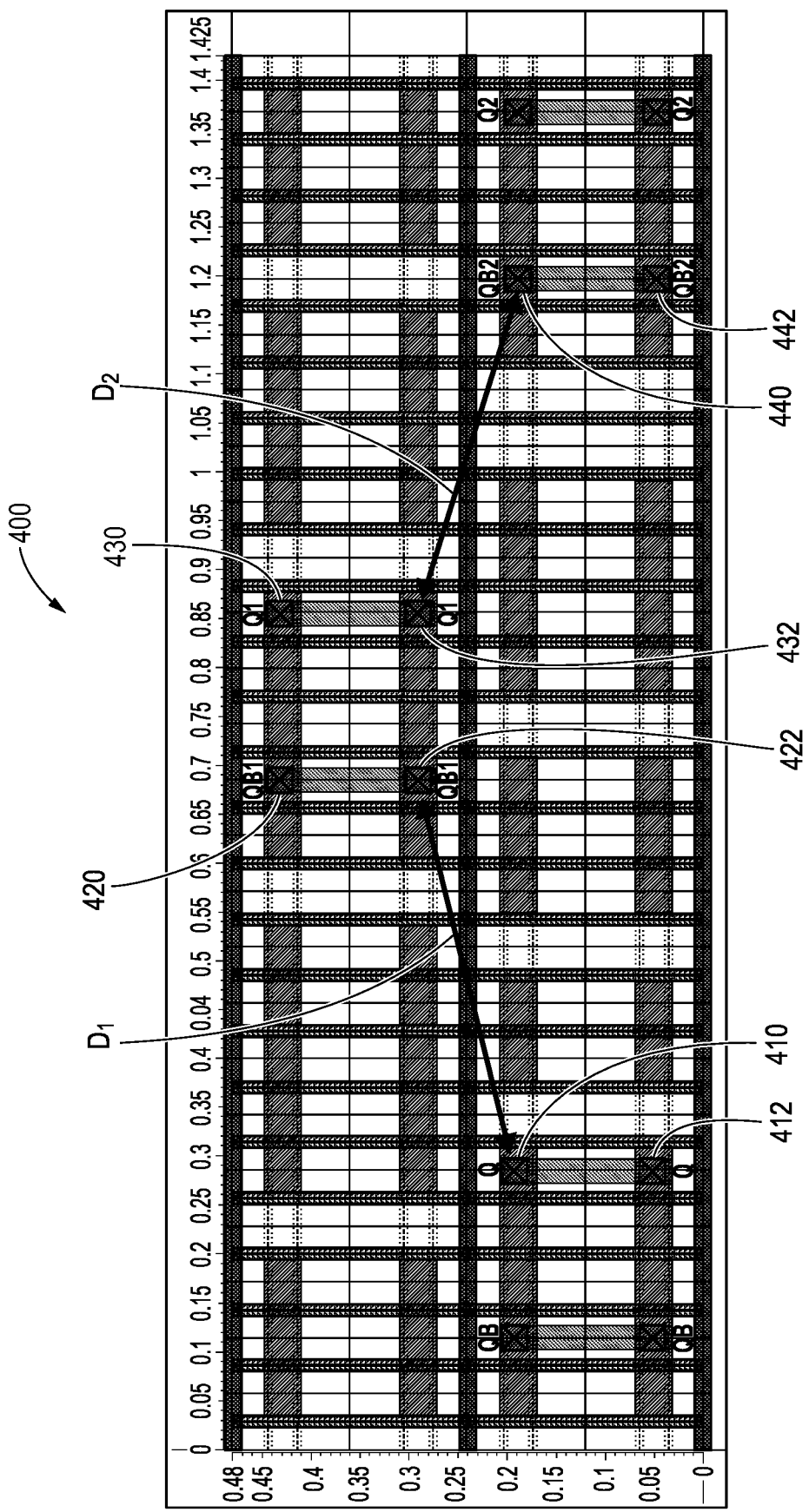
FIG. 4 illustrates a layout view depicting distances between critical nodes, according to an example.

FIG. 4 illustrates a layout view depicting distances between critical nodes, according to an example.

The layout view 400 illustrates exemplary critical nodes within a device.

A set of critical nodes 410, 412 are depicted in the bottom left-hand side of the layout view 400. A first set of critical nodes 420, 422 and a second set of critical nodes 430, 432 are depicted on the top section of the layout view 400. Another set of critical nodes 440, 442 are depicted in the bottom right-hand side of the layout view 400. The critical nodes can also be referred to as latch nodes. In one example, critical nodes 410, 412 can represent a first set of parity nodes and critical nodes 440, 442 can represent a second set of parity nodes. In another example, the critical nodes 420, 422, 430, 432 can represent the output nodes (q).

Significant distances are maintained between critical nodes to maintain nodal redundancy and to prevent a same SEU from flipping or corrupting multiple bits. For example, a significant distance is maintained between critical node 410 and critical node 420. The distance can be designated as $D_1$. In one example, the distance $D_1$ is >0.3 um. Similarly, a significant distance is maintained between critical node 432 and critical node 440. The distance can be designated as $D_2$. In one example, the distance $D_2$ is >0.3 um. In another example, the distances $D_1$ and $D_2$ can be >0.25 um. It is noted that the appropriate or desired distances between critical nodes is application specific. In a terrestrial environment application, e.g., it may be permissible or acceptable to have the critical nodes closer to each other. However, in a space datacenter application, e.g., it may be desired to have the critical nodes at larger distances with respect to each other as it would be extremely difficult or impossible to send a technician to remedy the situation in such environment. One skilled in the art can contemplate several appropriate critical node distances to suit particular applications.

As a result, since the SEU-enhanced circuit 100 has the capability to correct only one bit in error, it is desirable that the internal loads are spaced apart so that one SEU is less likely to corrupt multiple bits in in the FF. In order to achieve dual lock redundancy, physical spacing between redundant critical nodes can improve resiliency or fault tolerance.

Figures 5, 6:
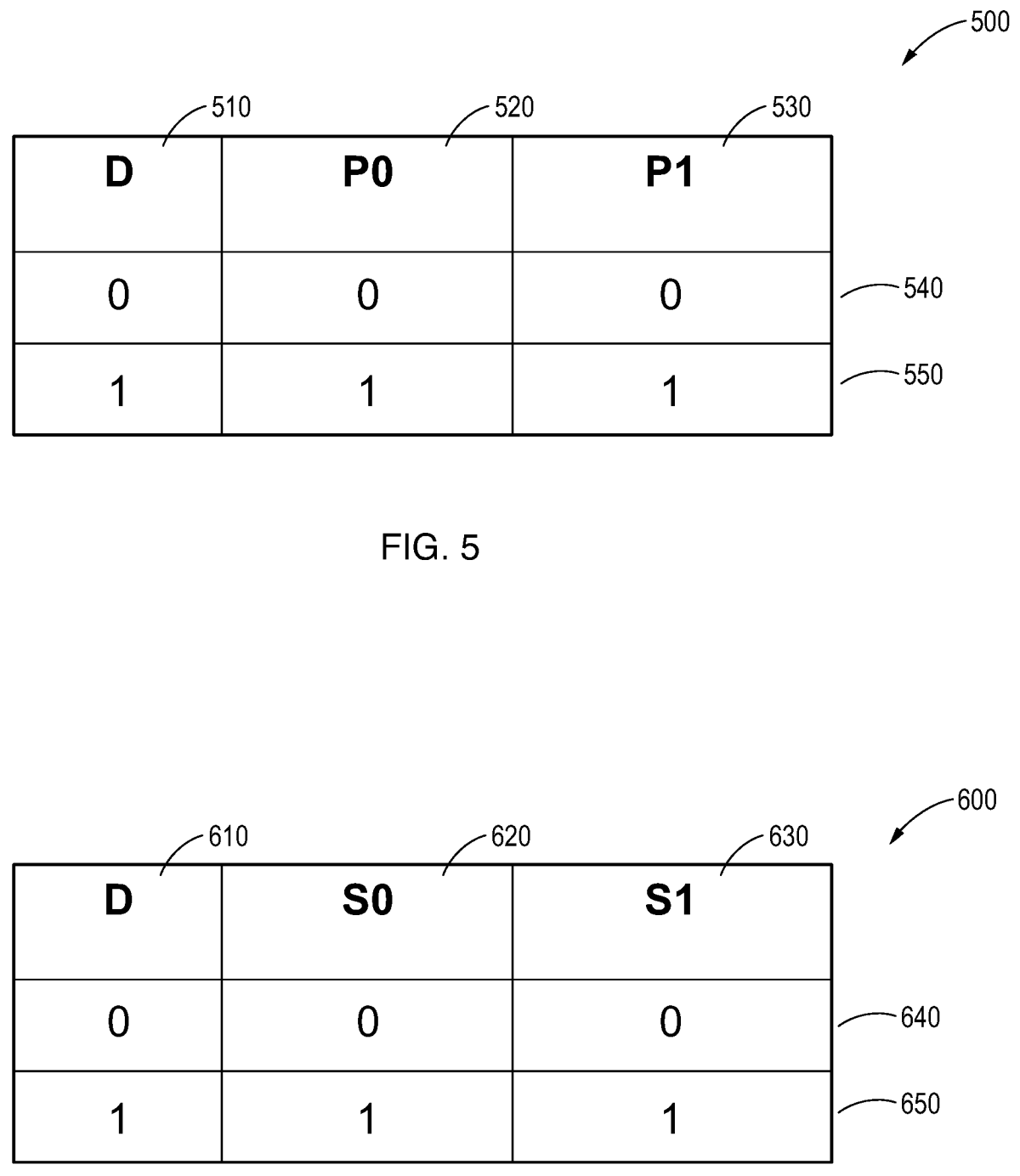

FIG. 5 illustrates a truth table for the parity bits, according to an example.

The truth table 500 includes three columns. The first column 510 represents the input (D). The second column 520 represents the first parity bit (P0), whereas the third column 530 represents the second parity bit (P1). The truth table 500 further includes two rows. The first row 540 and the second row 550 indicate the data as either 0 or 1. The equations can be given as P0=D and P1=D.

If the data input is 0, then both the first parity bit and the second parity bit are also 0. If the data input is 1, then both the first parity bit and the second parity bit are also 1. Thus, when encoding with data 0 or data 1, two parity bits are used. When the input is 0, both parity bits are 0. This is referred to as even parity. Even parity refers to a parity checking mode in asynchronous communication systems in which an extra bit, called a parity bit, is set to zero if there is an even number of one bits in a one-byte data item. It is noted that parity bits are added to transmitted messages to ensure that the number of bits with a value of 1 in a set of bits add up to even or odd numbers.

FIG. 6 illustrates a truth table for the syndromes, according to an example.

Similarly to FIG. 5, the truth table 600 includes three columns. The first column 610 represents the input (D). The second column 620 represents the first syndrome (S0), whereas the third column 630 represents the second syndrome (S1). The truth table 600 further includes two rows. The first row 640 and the second row 650 indicate the data as either 0 or 1. The equations can be given as S1=D^P1 and S0=D^P0.

If the data input is 1, then both the first syndrome bit and the second syndrome bit are also 1. If the data input is 0, then both the first syndrome bit and the second syndrome bit are also 0. Thus, when decoding with data 0 or data 1, two syndrome bits are used, corresponding to the first and second parity bits of FIG. 5.

Figure 7:
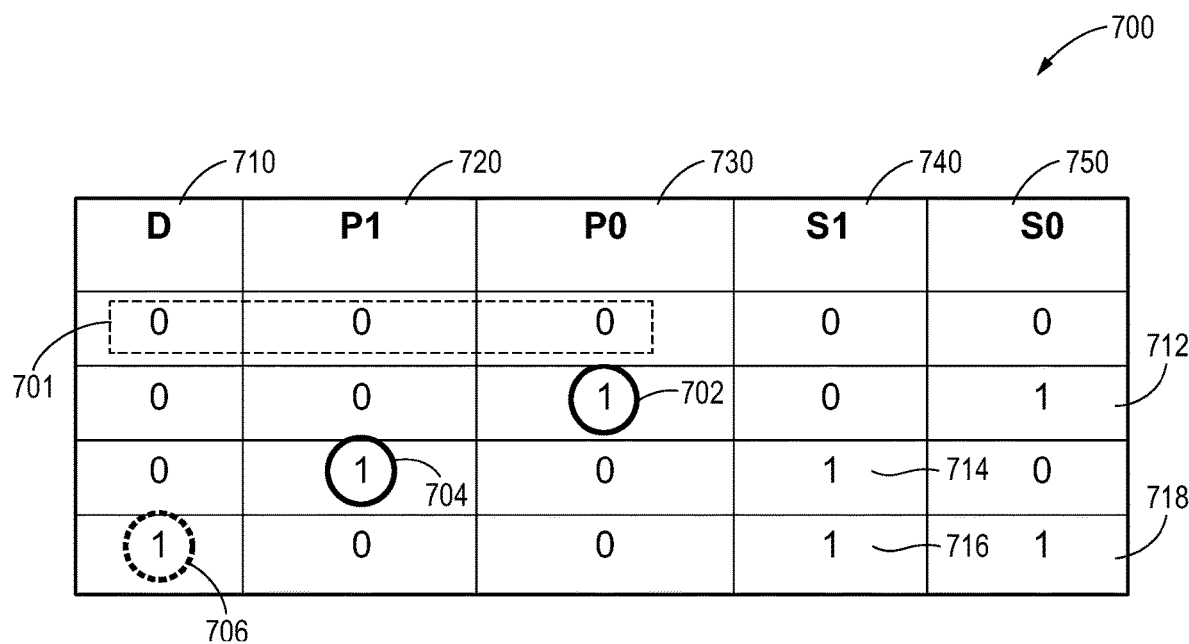
FIG. 7 illustrates a truth table for a single bit flip scenario when the stored data is 0, according to an example.

FIG. 7 illustrates a truth table for a single bit flip scenario when the stored data is 0, according to an example.

The truth table 700 includes a first column 710, a second column 720, a third column 730, a fourth column 740, and a fifth column 750. The first column 710 is the data input (D), the second column 720 is the second parity bit, the third column 730 is the first parity bit, the fourth column 740 is the second syndrome, and the fifth column 750 is the first syndrome.

The encoded data 701 is designated as 0. In the top row there is no SEU. The SEU is absent.

In a first row, if D, P0, and P1 are 0, both S1 and S0 are also 0. This corresponds to when there is no SEU.

In a second row, if P0 gets flipped by a SEU, that is, the bit is corrupted, P0 is 1, as designated by circle 702. The flipping of P0 causes S0 to change to 1, as designated at box 712. With reference to FIG. 2 discussed above, this triggers a flag. However, a flip is not triggered since this is a parity bit. A parity node, even if it becomes corrupted, does not trigger a flip (i.e. no bit correction). Thus, a flag is generated without activation of the correction circuitry. In the instant case, S0 in FIG. 2 remains low (i.e., indicating no bit flip).

In a third row, if P1 gets flipped, that is, the bit is corrupted, P1 is 1, as designated by circle 704. The flipping of P1 causes S1 to change to 1, as designated at box 714. With reference to FIG. 2 discussed above, this triggers a flag. However, a flip is not triggered since this is a parity bit. A parity node, even if it becomes corrupted, does not trigger a flip (i.e., no bit correction). Thus, a flag is generated without activation of the correction circuitry. In the instant case, S0 in FIG. 2 remains low (i.e., indicating no bit flip).

In a fourth row, if D gets flipped, that is, the bit is corrupted, D is 1, as designated by circle 706. The flipping of D causes both S1 and S0 to change to 1, as designated at boxes 716, 718, respectively. With reference to FIG. 2 discussed above, this triggers both a flag and a flip. Since this is not a parity node, but a data node, a flip is enabled with the generation of the flag. As such, the data node is restored to its original state. In the instant case, S0 and S1 change to high.

S0 counts as the first bit count (01), S1 counts as the second bit count (10), and S0, S1 together counts as the third count bit (11). The three scenarios can be used to generate a flag.

The equations are given as S1=D^P1 and S0=D^P0.

Figure 8:
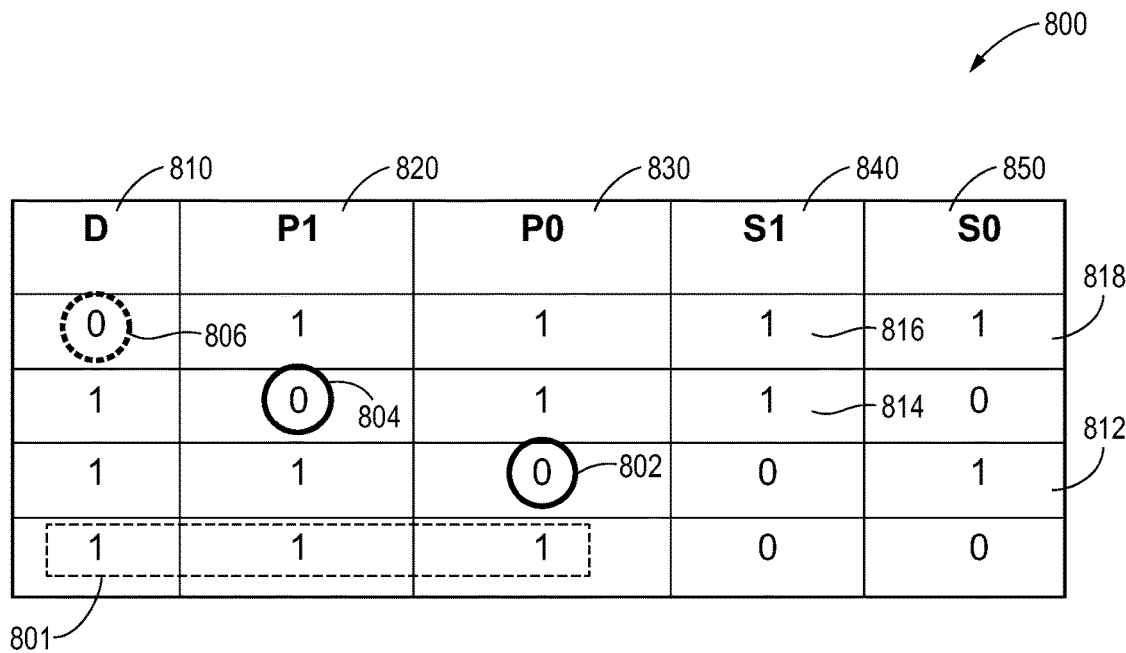
FIG. 8 illustrates a truth table for a single bit flip scenario when the stored data is 1, according to an example.

FIG. 8 illustrates a truth table for a single bit flip scenario when the stored data is 1, according to an example.

The truth table 800 includes a first column 810, a second column 820, a third column 830, a fourth column 840, and a fifth column 850. The first column 810 is the data input (D), the second column 820 is the second parity bit, the third column 830 is the first parity bit, the fourth column 840 is the second syndrome, and the fifth column 850 is the first syndrome.

The encoded data 801 is designated as 1. In the last row there is no SEU.

In the fourth row, if D, P0, and P1 are 1, both S1 and S0 are 0. This corresponds to when there is no SEU. The SEU is absent.

In the third row, if P0 gets flipped by a SEU, that is, the bit is corrupted, P0 is 0, as designated by circle 802. The flipping of P0 causes S0 to change to 1, as designated at box 812. With reference to FIG. 2 discussed above, this triggers a flag. However, a flip is not triggered since this is a parity bit. A parity node, even if it becomes corrupted, does not trigger a flip (i.e., no bit correction). Thus, a flag is generated without activation of the correction circuitry. In the instant case, S0 in FIG. 2 remains low (i.e., indicating no bit flip).

In the second row, if P1 gets flipped, that is, the bit is corrupted, P1 is 0, as designated by circle 804. The flipping of P1 causes S1 to change to 1, as designated at box 814. With reference to FIG. 2 discussed above, this triggers a flag. However, a flip is not triggered since this is a party bit. A parity node, even if it becomes corrupted, does not trigger a flip (i.e., no bit correction). Thus, a flag is generated without activation of the correction circuitry. In the instance case, S0 in FIG. 2 remains low (i.e., indicating no bit flip)

In the first row, if D gets flipped, that is, the bit is corrupted, D is 0, as designated by circle 806. The flipping of D causes both S1 and S0 to change to 1, as designated at boxes 816, 818, respectively. With reference to FIG. 2 discussed above, this triggers both a flag and a flip. Since this is not a parity node, but a data node, a flip is enabled with the generation of the flag. As such, the data node is restored to its original state. In the instance case, S0 and S1 change to high.

S0 counts as the first bit count (01), S1 counts as the second bit count (10), and S0, S1 together counts as the third count bit (11). The three scenarios can be used to generate a flag.

The equations are given as S1=D^P1 and S0=D^P0.

For FIGS. 7 and 8, it is noted that the circles 706, 708 indicate an SEU at the data input (should flip before storing), whereas circles 702, 704, 802, 804 indicate SEC at the reference (should not flip before storing).

As a result, the SEU-enhanced circuit 100 has the capability to correct one bit when an SEU is detected. In a scenario where two bits are corrupted, the SEU-enhanced circuit 100 has the capability to generate a flag for each corrupted bit, even though it will not correct both bits. Thus, at a minimum, there is an indication or notification that something is amiss and the operators of the, e.g., space system, are at least aware of the situation and can make strategic decisions in response thereto.

Figure 9:
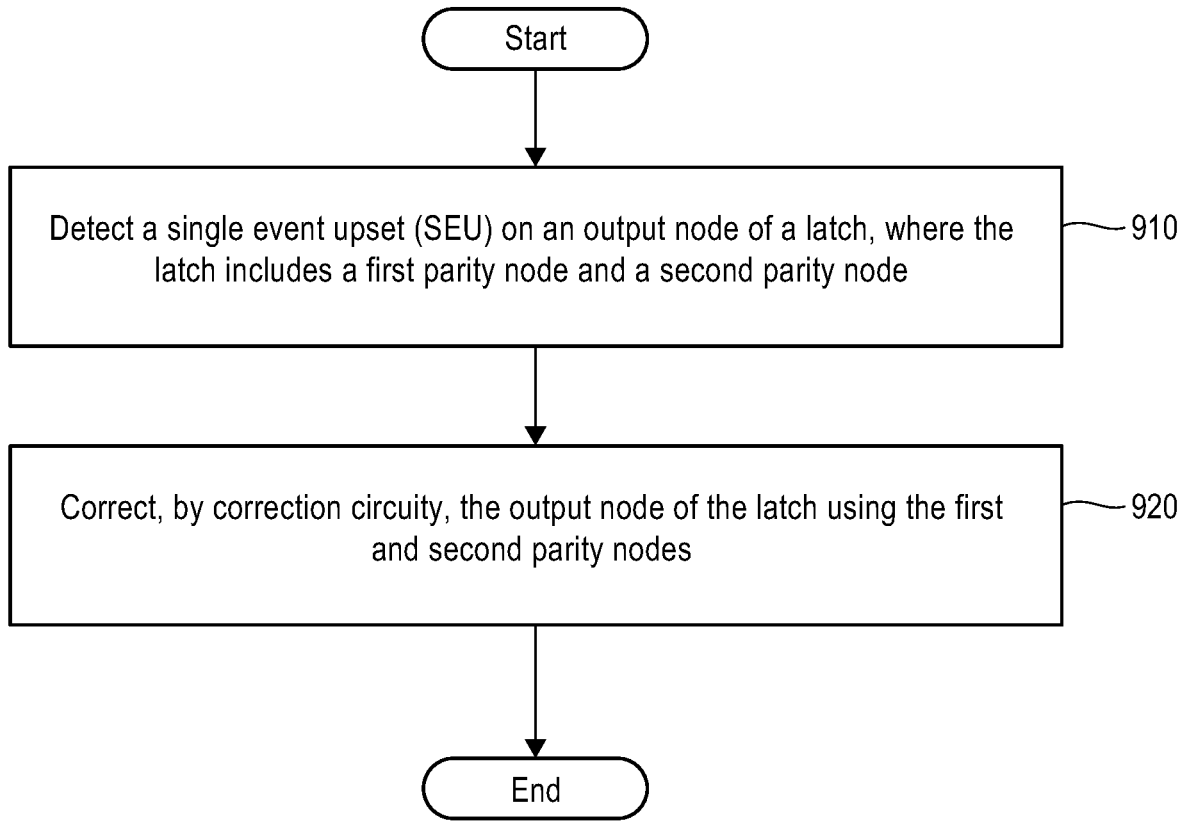
FIG. 9 illustrates a method for implementing the circuit with error correction capability of FIG. 1, according to an example.

FIG. 9 illustrates a method for implementing the circuit with error correction capability of FIG. 1, according to an example.

At block 910, detect a single event upset (SEU) on an output node of a latch where the latch includes a first parity node and a second parity node. For example, this can be performed using the circuitry described above in FIGS. 1 and 2.

At block 920, correct, by correction circuitry, the output node of the latch using the first and second parity nodes. One implementation of the correction circuitry is shown in FIG. 3.

In conclusion, the SEU-enhanced circuit 100 provides a mechanism to detect when a memory element has been corrupted, and further provide a manner of correcting for the corrupted memory element. Instead of incorporating features to avoid the data from being corrupted, the exemplary circuit goes a step further by providing a feature to correct the data and generate an error flag (after an SEU has been detected). Thus, the SEU-enhanced circuit 100 is suitable for a space environment where a system sent to space (e.g., moon, Mars, etc.) incorporates the SEU-enhanced circuit 100 because it has the capability to withstand large radiation exposure. As a result, the SEU-enhanced circuit 100 is suitable for mission critical applications because it provides a resiliency that is about 1000 times larger than conventional or standard FF configurations, thus advantageously minimizing or mitigating system downtime.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A memory circuit comprising:
    a latch including an output node, a first parity node, and a second parity node; and correction circuitry configured to correct a single event upset (SEU) at the output node using the first and second parity nodes, wherein the correction circuitry only corrects the SEU when a data input is a first value and a first parity bit at the first parity node and a second parity bit at the second parity node are a second value.

2. The memory circuit of claim 1, wherein, when the data input is the first value and the SEU is absent, the first parity bit at the first parity node and the second parity bit at the second parity node also have the first value.

3. The memory circuit of claim 1, wherein, when the data input is the first value and is exposed to the SEU, a flag is generated and the first value is changed to the second value by the correction circuitry.

4. The memory circuit of claim 1, wherein, when the first and second parity nodes are the first value and are exposed to the SEU, a flag is generated without activation of the correction circuitry such that the first value remains intact.

5. The memory circuit of claim 1 further comprising an error flag generated in response to detecting the SEU is at one of: the output node, the first parity node, or the second parity node.

6. The memory circuit of claim 5, wherein, when the error flag is generated for the output node, the memory circuit flips the output node to an original state.

7. The memory circuit of claim 1, wherein a distance between the output node and the first parity node is at least greater than 0.3 um, and a distance between the output node and the second parity node is at least greater than 0.3 um.

8. A method comprising:
 detecting a single event upset (SEU) on an output node of a latch, wherein the latch includes a first parity node and a second parity node; and
 correcting, by correction circuitry, the output node of the latch using the first and second parity nodes, wherein the correction circuitry only corrects the SEU when a data input is a first value and a first parity bit at the first parity node and a second parity bit at the second parity node are a second value.

9. The method of claim 8, wherein, when the data input is the first value and the SEU is absent, the first parity bit at the first parity node and the second parity bit at the second parity node also have the first value.

10. The method of claim 8, wherein, when the data input is the first value and is exposed to the SEU, a flag is generated and the first value is changed to the second value by the correction circuitry.

11. The method of claim 8, wherein, when the first and second parity nodes are the first value and are exposed to the SEU, a flag is generated without activation of the correction circuitry such that the first value remains intact.

12. The method of claim 8, further comprising generating an error flag in response to detecting the SEU at one of: the output node, the first parity node, or the second parity node.

13. The method of claim 12, wherein, when the error flag is generated for the output node, flipping the output node to an original state.

14. The method of claim 8, wherein a distance between the output node and the first parity node is at least greater than 0.3 um, and a distance between the output node and the second parity node is at least greater than 0.3 um.

15. A memory circuit comprising:
 a master latch to receive data input; and
 a slave latch coupled to the master latch, the slave latch including an output node, a first parity node, and a second parity node, wherein the first and second parity nodes are used to detect and correct a SEU at the output node, and wherein the first and second parity nodes only corrects the SEU when a data input is a first value and a first parity bit at the first parity node and a second parity bit at the second parity node are a second value.

16. The memory circuit of claim 15, wherein, when the data input is the first value and the SEU is absent, the first parity bit at the first parity node and the second parity bit at the second parity node also have the first value.

17. The memory circuit of claim 15, wherein, when the first and second parity nodes are the first value and are exposed to the SEU, a flag is generated without activation of correction circuitry such that the first value remains intact.

18. The memory circuit of claim 15 further comprising an error flag generated in response to detecting the SEU at one of: the output node, the first parity node, or the second parity node.

19. The memory circuit of claim 18, wherein, when the error flag is generated for the output node, the memory circuit flips the output node to an original state.

20. The memory circuit of claim 15, wherein a distance between the output node and the first parity node is at least greater than 0.3 um, and a distance between the output node and the second parity node is at least greater than 0.3 um.

\* \* \* \* \*